United States Patent Office.

FRITZ ENGELHORN, AUGUST CLEMM, HEINRICH CARO, AND CARL CLEMM, OF MANNHEIM, GERMANY.

Letters Patent No. 92,176, dated July 6, 1869.

IMPROVED METHOD OF OBTAINING BENZOLE AND ITS HOMOLOGUES FROM COAL-GAS

The Schedule referred to in these Letters Patent and making part of the same.

To all whom it may concern:

Be it known that we, FRITZ ENGELHORN, Dr. AUGUST CLEMM, HEINRICH CARO, and Dr. CARL CLEMM, of the city of Mannheim, in the Grand Duchy of Baden, Germany, have invented a new Mode of Obtaining Benzole, and its Homologues, from the Gases Produced by the Destructive Distillation of Mineral Coal, bituminous shale, bitumen, and other organic substances, applicable for the manufacture of photogenic oils or gas for lighting-purposes; and we do hereby declare that the following is a full and exact description thereof.

The products of the destructive distillation of coals, and some native bitumen, contain, as well known, a series of liquid hydrocarbons of the chemical formula $C_nH_{n_6}$, known as benzole, toluole, xylole, cumole, &c. These liquids have hitherto been exclusively separated from the tar produced in the manufacture of gas or photogenic oils. They are, on account of their great volatility, also found in the illuminating-gas; especially is this the case with the most volatile, but also most important fluid, the benzole. In the analyses of gas made by Landolt and Frankland, they, as well as the naphthaline and paranaphthaline, have, indeed, not been taken into regard; but the researches of Pitschke, in Berlin, and our own experiments, prove that benzole, and its homologues, are contained in the gas in a much larger percentage than supposed. They have been met with in the coal-gas in proportions which fully guarantee their economical production. Benzole has hitherto been separated therefrom by means of pressure, refrigeration, and chemical agents, such as nitric and sulphuric acids, chlorine, bromine, &c.

The requirements of the arts and manufactures at the present day, demand a more considerable production of the benzole and its homologues; and this end is most easily obtained by separating them from the coal-gas. As the best means for this separation, may all those liquids be considered which dissolve the volatile fluids in question, without changing them in their nature, and as such ones we enumerate, the neutral bodies from the distillation of coal-tar, known as light oils, especially those boiling at a higher temperature than the first members of the benzole series; petroleum, turf-oil, and oils from bituminous schists; also vegetable oils, and all substances of similar properties.

The preparation of the benzole and its homologues is accomplished in bringing the coal-gas in most intimate contact with one or several of the above-mentioned solvents, in order that the volatile fluids existing in the gas may be completely taken up. They are subsequently separated from their solvents by a simple fractional distillation.

This operation may be carried out in apparatus of the most varied construction.

The gas may, for instance, be conveyed through an apparatus, as has been proposed by Mr. Brunquell, for the manufacture of yellow prussiate of potassa, and described in Dr. Hugo Fleck's "Manufacture of Chemical Products from Animal Substances," page 44; or, in passing it through vessels similar to the wet purifiers used in removing the impurities of gas.

By subsequent distillation the benzole, or its homologues, is obtained in a perfectly pure state, while the liquids which served as solvents are recovered again.

What we claim as our invention, and desire to secure by Letters Patent, is—

The production of the benzole, and its homologues, from the coal-gas, and other gaseous products capable of supplying light, by first absorbing, and subsequently separating them, as herein described, using for that purpose the above-mentioned liquid compounds, or any other substantially the same, and which will produce the intended effect.

In witness whereof, we have hereunto set our hands, this 25th day of February, 1869.

FRITZ ENGELHORN.
    DR. AUGUST CLEMM.
    HEINRICH CARO.
    DR. CARL CLEMM.

Witnesses:
 P. BARTHEL,
 C. V STOELPL,
 ADOLPH OTT, *Agent*,
 L. H. MITCHELL,
 CHAS. C. WESTERN.